United States Patent
Ikuta

(10) Patent No.: US 9,869,956 B2
(45) Date of Patent: Jan. 16, 2018

(54) IMAGE FORMING APPARATUS CONNECTED TO A PLURALITY OF IMAGE FORMING APPARATUSES, IMAGE FORMING SYSTEM INCLUDING A PLURALITY OF IMAGE FORMING APPARATUSES, AND IMAGE FORMING METHOD

(71) Applicant: Konica Minolta, Inc., Chiyoda-ku, Tokyo (JP)

(72) Inventor: Masaya Ikuta, Kanagawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 14/806,796

(22) Filed: Jul. 23, 2015

(65) Prior Publication Data

US 2016/0054694 A1    Feb. 25, 2016

(30) Foreign Application Priority Data

Aug. 19, 2014  (JP) .................................. 2014-166864

(51) Int. Cl.
G03G 15/00    (2006.01)
H04N 1/46    (2006.01)
(Continued)

(52) U.S. Cl.
CPC ....... *G03G 15/5025* (2013.01); *H04N 1/0092* (2013.01); *H04N 1/00482* (2013.01);
(Continued)

(58) Field of Classification Search
CPC ................................................ G03G 15/5025
See application file for complete search history.

(56) References Cited

U.S. PATENT DOCUMENTS 7,061,635 B1 * 6/2006 Wanda .................. G06F 3/1213
                                                             358/1.1
7,408,657 B2 * 8/2008 Suzuki ............... H04N 1/00411
                                                            358/1.13
(Continued)

FOREIGN PATENT DOCUMENTS

JP    2003-208286 A    7/2003
JP    2004-355086 A    12/2004
(Continued)

OTHER PUBLICATIONS

Machine translation of JP 2003-208286.*
(Continued)

*Primary Examiner* — David Bolduc
(74) *Attorney, Agent, or Firm* — Buchanan Ingersoll & Rooney PC

(57) ABSTRACT

Provided is an image forming system in which a plurality of image forming apparatuses are connected through a network, the image forming system including a control unit that controls the image forming apparatuses, wherein when a plurality of image forming apparatuses output a job requested in an arbitrary image forming apparatus, the control unit compares image quality parameters, such as a tone, a density balance, and a line width, in the image forming apparatuses, selects image forming apparatuses that have image quality parameters similar to each other and that can output the job, and causes the selected image forming apparatuses to output the job.

24 Claims, 14 Drawing Sheets

(51) Int. Cl.
*H04N 1/60* (2006.01)
*H04N 1/00* (2006.01)
*H04N 1/32* (2006.01)

(52) U.S. Cl.
CPC ........... *H04N 1/32545* (2013.01); *H04N 1/46* (2013.01); *H04N 1/60* (2013.01)

(56) References Cited

U.S. PATENT DOCUMENTS

| | | | | |
|---|---|---|---|---|
| 7,443,523 B2* | 10/2008 | Leone, III | ............ | G06F 3/1205 358/1.13 |
| 7,477,412 B2* | 1/2009 | Miwa | .................... | G06F 3/1212 358/1.15 |
| 7,639,381 B2* | 12/2009 | Shima | ................ | H04N 1/32545 358/1.1 |
| 7,804,607 B2* | 9/2010 | Tomita | .................. | G06F 3/1204 358/1.12 |
| 2002/0089684 A1* | 7/2002 | Barry | .................... | G03G 13/08 358/1.14 |
| 2002/0089691 A1* | 7/2002 | Fertlitsch | ............. | G06F 3/1215 358/1.15 |
| 2003/0103234 A1* | 6/2003 | Takabayashi | ...... | H04N 1/00132 358/1.15 |
| 2004/0172348 A1* | 9/2004 | Kawamori | ........... | G06Q 20/355 705/31 |
| 2004/0190057 A1* | 9/2004 | Takahashi | ............. | G06F 3/1205 358/1.15 |
| 2005/0183010 A1* | 8/2005 | Iwasaki | ................. | G06F 3/1204 715/246 |
| 2006/0114482 A1* | 6/2006 | Song | ................. | H04N 1/40006 358/1.9 |
| 2006/0114509 A1* | 6/2006 | Itaki | ................... | H04N 1/00347 358/1.15 |
| 2006/0126115 A1* | 6/2006 | Morikawa | ............. | G06F 3/1213 358/1.15 |
| 2006/0238799 A1* | 10/2006 | Kidokoro | ........... | H04N 1/00233 358/1.15 |
| 2007/0268519 A1* | 11/2007 | Appercel | ............. | G06F 3/1205 358/1.15 |
| 2008/0018684 A1* | 1/2008 | Nagashima | .......... | B41J 2/14233 347/10 |
| 2008/0165374 A1* | 7/2008 | Han | ....................... | G06K 15/02 358/1.9 |
| 2009/0174898 A1* | 7/2009 | Ono | .................... | H04N 1/00915 358/1.15 |
| 2009/0180164 A1* | 7/2009 | Miyagi | ............... | H04N 1/40012 358/518 |
| 2009/0303502 A1* | 12/2009 | Robinson | ......... | G06Q 10/06315 358/1.9 |
| 2011/0222868 A1* | 9/2011 | Sakatani | ............. | G03G 15/5062 399/15 |
| 2011/0222869 A1* | 9/2011 | Sakatani | ............. | G03G 15/5062 399/15 |
| 2012/0008166 A1 | 1/2012 | Noto et al. | | |
| 2013/0235430 A1* | 9/2013 | Sakatani | ............... | G06K 15/129 358/3.23 |
| 2014/0192375 A1 | 7/2014 | Morita | | |

FOREIGN PATENT DOCUMENTS

| | | |
|---|---|---|
| JP | 2006-048522 A | 2/2006 |
| JP | 2006-154944 A | 6/2006 |
| JP | 2006-195531 A | 7/2006 |
| JP | 2007-026175 A | 2/2007 |
| JP | 2009-289237 A | 12/2009 |
| JP | 2012-018499 A | 1/2012 |

OTHER PUBLICATIONS

Machine translation of JP 2006154944 A.*
Machine translation of JP 2004355086 A.*
Extended European Search Report issued in corresponding European Patent Application No. 15177193.8-1903 / 2996324, dated Apr. 1, 2016 (8 pages).
Office Action (Notification of Reasons for Refusal) dated Sep. 21, 2016, by the Japanese Patent Office in corresponding Japanese Patent Application No. 2014-166864, and an English language translation of the Office Action (12 pages).
The First Office Action issued in corresponding Chinese Patent Application No. 201510507038.2, dated Oct. 11, 2017, with English Translation (19 pages.

* cited by examiner

Tone comparison chart

IMAGE FORMING APPARATUS CONNECTED TO A PLURALITY OF IMAGE FORMING APPARATUSES, IMAGE FORMING SYSTEM INCLUDING A PLURALITY OF IMAGE FORMING APPARATUSES, AND IMAGE FORMING METHOD

CROSS-REFERENCE TO RELATED APPLICATIONS

The present application claims priority under 35 U.S.C. §119 to Japanese Patent Application No. 2014-166864, filed Aug. 19, 2014. The contents of this application are incorporated herein by reference in their entirety.

BACKGROUND OF THE INVENTION

Field of the Invention

The present invention relates to an image forming apparatus, an image forming system, and an image forming method that can use a plurality of image forming apparatuses to output a job.

Description of the Related Art

Currently, there is a technique of distributing the load of outputting a printed matter when a large amount of printed matter is to be output, and an example of the technique includes a system called distributed printing for outputting a printed matter at the same time from a plurality of image forming apparatuses on a network.

In selecting image forming apparatuses that perform the distributed printing, image forming apparatuses that can output the printed matter (setting of color or monochrome, presence or absence of a post-processing apparatus, and the like) need to be selected. In Japanese Patent Laid-Open No. 2003-208286, a color reproducible range is taken into account to select printers that can reproduce colors included in a print file in the distributed printing.

In the distributed printing, it is desirable to more efficiently output the printed matter and to output the printed matter with excellent quality. Japanese Patent Laid-Open No. 2007-026175 discloses an image forming system for ranking image forming apparatuses based on indexes regarding the output capability, and image forming apparatuses are selected based on the indexes, such as print speed and image quality (meaning resolution), to distribute a job.

Since a plurality of image forming apparatuses output the printed matter, the distributed printing has a problem that there is a difference in the image quality of the printed matter due to the mechanical difference between the image forming apparatuses even if the image quality is adjusted in each image forming apparatus. The problem similarly occurs in the apparatus and the system illustrated in Japanese Patent Laid-Open Nos. 2003-208286 and 2007-026175. More specifically, in Japanese Patent Laid-Open Nos. 2003-208286 and 2007-026175, specifications of machines are just compared, or ideal values and image quality of the image forming apparatuses are just compared. The difference in the image quality due to the difference between machines in the distributed printing is not taken into account.

The present invention has been made in view of the circumstances, and an object of the present invention is to perform printing while reducing, as much as possible, the difference in the image quality due to the difference between machines when a plurality of image forming apparatuses output the printed matter.

SUMMARY OF THE INVENTION

To achieve at least one of the abovementioned objects, an the image forming system reflecting a first aspect of the present invention provides an image forming system in which a plurality of image forming apparatuses are connected through a network, the image forming system including a control unit that controls the image forming apparatuses, wherein when a plurality of image forming apparatuses output a job requested in an arbitrary image forming apparatus, the control unit compares image quality parameters in the image forming apparatuses, selects image forming apparatuses that have image quality parameters similar to each other and that can output the job, and causes the selected image forming apparatuses to output the job.

In the image forming system according to the abovementioned aspect, it is preferable that the image quality parameters include one or more of a tone, a density balance, and a line width.

In the image forming system according to the abovementioned aspect, it is preferable that, in selecting the image forming apparatuses, the control unit selects a preset number of image forming apparatuses.

In the image forming system according to the abovementioned aspect, it is preferable that, in selecting the image forming apparatuses, the control unit selects the image forming apparatuses in which a difference in the image quality parameters is within a preset range.

In the image forming system according to the abovementioned aspect, it is preferable that the control unit compares the image quality parameters based on the image quality parameters in a specific image forming apparatus.

In the image forming system according to the abovementioned aspect, it is preferable that the specific image forming apparatus is an image forming apparatus that has accepted the job.

In the image forming system according to the abovementioned aspect, it is preferable that when the job is a color image, the control unit emphasizes the tone among the parameters of image quality to compare the parameters.

In the image forming system according to the abovementioned aspect, it is preferable that when the job is a monochrome image, the control unit emphasizes the density balance among the parameters of image quality to compare the parameters.

In the image forming system according to the abovementioned aspect, it is preferable that when the job is a text or a line drawing, the control unit emphasizes the line width among the parameters of image quality to compare the parameters.

In the image forming system according to the abovementioned aspect, it is preferable that when an image quality parameter to be emphasized regarding the job is designated by a user, the control unit emphasizes the image quality parameter designated by the user among the image quality parameters to compare the parameters.

In the image forming system according to the abovementioned aspect, it is preferable that when a color to be emphasized regarding the comparison of the tone is designated by a user, the control unit emphasizes the color designated by the user to compare the tone.

In the image forming system according to the abovementioned aspect, it is preferable that the image forming system further comprises an operation unit that accepts operation input, wherein the control unit compares the image quality parameters based on image quality parameters input and set by the operation unit.

In the image forming system according to the abovementioned aspect, it is preferable that the image quality parameters of the image forming apparatuses are registered in advance in the control unit.

In the image forming system according to the abovementioned aspect, it is preferable that the image quality parameters are acquired based on images output by the image forming apparatuses and read by a image reading apparatuses.

In the image forming system according to the abovementioned aspect, it is preferable that the image forming apparatuses periodically acquire the image quality parameters and transmit the image quality parameters to the control unit.

In the image forming system according to the abovementioned aspect, it is preferable that the image forming apparatuses periodically correct the image quality and transmit the image quality parameters after the correction to the control unit.

In the image forming system according to the abovementioned aspect, it is preferable that when the number of output sheets of the job is equal to or greater than a predetermined number of sheets, and the image quality is corrected in any of the image forming apparatuses during the output of the job, if the image quality parameters after the correction are different from the image quality parameters used for the comparison, the image quality parameters of the image forming apparatuses are compared again based on the image quality parameters after the correction, image forming apparatuses that have similar image quality parameters are selected, and the selected image forming apparatuses output the job.

In the image forming system according to the abovementioned aspect, it is preferable that when the image quality is corrected in any of the image forming apparatuses during the output of the job, if the image quality parameters after the correction are different from the image quality parameters used at the start of the output, the image quality parameters of the image forming apparatuses are compared again based on the image quality parameters after the correction, image forming apparatuses that have similar image quality parameters are selected, and the selected image forming apparatuses output the job.

In the image forming system according to the abovementioned aspect, it is preferable that the control unit removes the image forming apparatus, in which a predetermined time has passed and/or more than a predetermined number of sheets are printed since the registration of the image quality parameters, from the comparison and selection target.

In the image forming system according to the abovementioned aspect, it is preferable that the control unit requests the image forming apparatus, in which a predetermined time has passed and/or more than a predetermined number of sheets are printed since the registration of the image quality parameters, to correct the image and registers the corrected image quality parameters.

In the image forming system according to the abovementioned aspect, it is preferable that the control unit requests the image correction before the comparison, registers the corrected image quality parameters, and performs the comparison based on the registered image quality parameters.

In the image forming system according to the abovementioned aspect, it is preferable that the selected image forming apparatuses output entire copies of the job and/or allocated pages.

To achieve at least one of the abovementioned objects, an image forming apparatus reflecting a first aspect of the present invention provides an image forming apparatus including: an image forming unit that forms an image; and a communication unit that is connected to a network to perform communication, the image forming apparatus connected to a plurality of image forming apparatuses through the network, the image forming apparatus including a control unit that controls the image forming apparatus, wherein when a plurality of image forming apparatuses output a job requested in an arbitrary image forming apparatus, the control unit compares image quality parameters in the image forming apparatuses, selects image forming apparatuses that have image quality parameters similar to each other and that can output the job, and instructs the selected image forming apparatuses to output the job through the communication unit.

To achieve at least one of the abovementioned objects, an image forming method reflecting a first aspect of the present invention provides an image forming method of outputting a job by using a plurality of image forming apparatuses in an image forming system in which a plurality of image forming apparatuses are connected through a network, the image forming method including:

a step of accepting a job requested to be output in an arbitrary image forming apparatus;

a step of comparing image quality parameters in the image forming apparatuses;

a step of selecting image forming apparatuses that have the image quality parameters similar to each other and that can output the job; and a step of outputting the job by the selected image forming apparatuses.

In the image forming method according to the abovementioned aspect, it is preferable that the image forming method further comprises a step of registering the image quality parameters of the image forming apparatuses before the comparison.

In the image forming method according to the abovementioned aspect, it is preferable that the image quality parameters are compared based on the image quality parameters in a specific image forming apparatus.

DETAILED DESCRIPTION OF THE PREFERRED EMBODIMENTS

Figure 1:
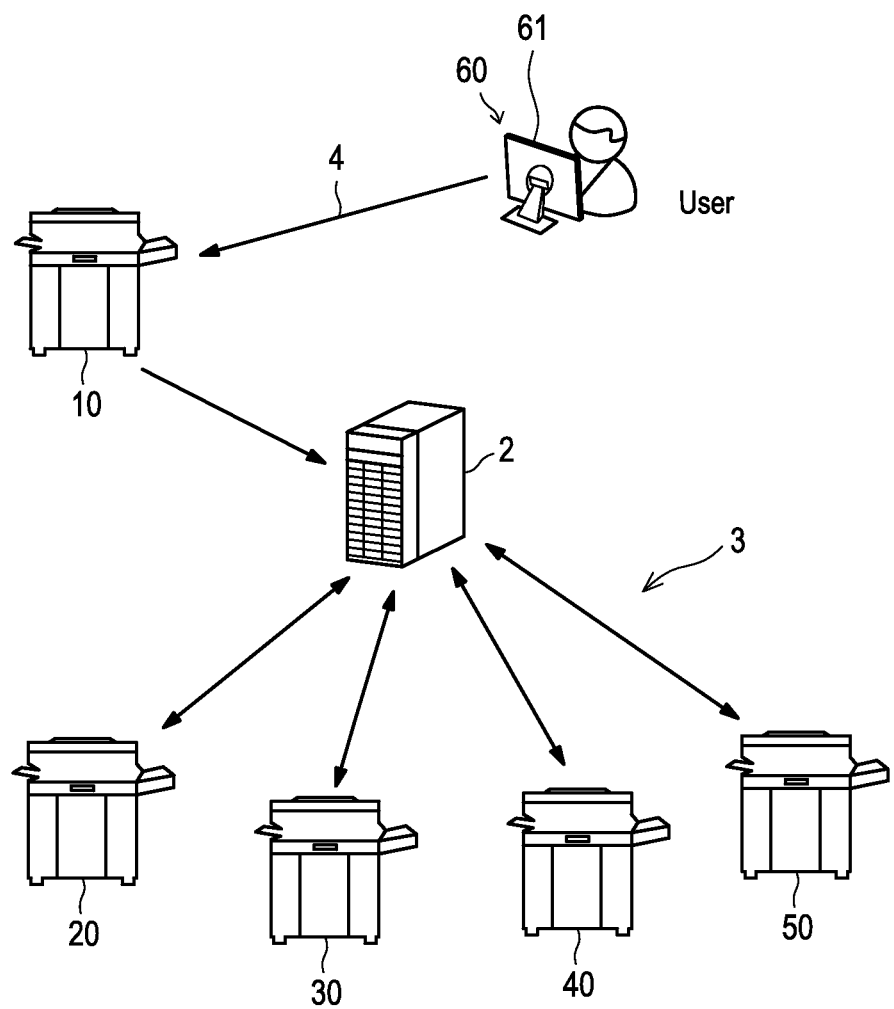
FIG. 1 is a schematic diagram showing an image forming system according to an embodiment of the present invention.

An image forming system 1 according to an embodiment of the present invention will now be described with reference to the attached drawings.

Image forming apparatuses (image forming apparatuses 10, 20, 30, 40, and 50 in the drawings) are connected by a LAN 3 to the image forming system 1 through a management apparatus 2, and a terminal 60 is connected to the image forming apparatus 10 by a LAN 4. The LANs 3 and 4 are equivalent to a network of the present invention. Although the network is connected in a star shape in the drawings, the network can be in any form, such as a ring shape and a bus type. The form of the network connection is not particularly limited in the present invention.

The presence or absence of a post-processing apparatus, the type of post-processing, the number of post-processing apparatuses, and the like are not particularly limited in the image forming apparatuses, and the device configuration is not particularly limited. The models of the image forming apparatuses can be all different, and part or all of the models can be the same. There can be a difference in the image quality between machines even if the models are the same.

Figure 2:
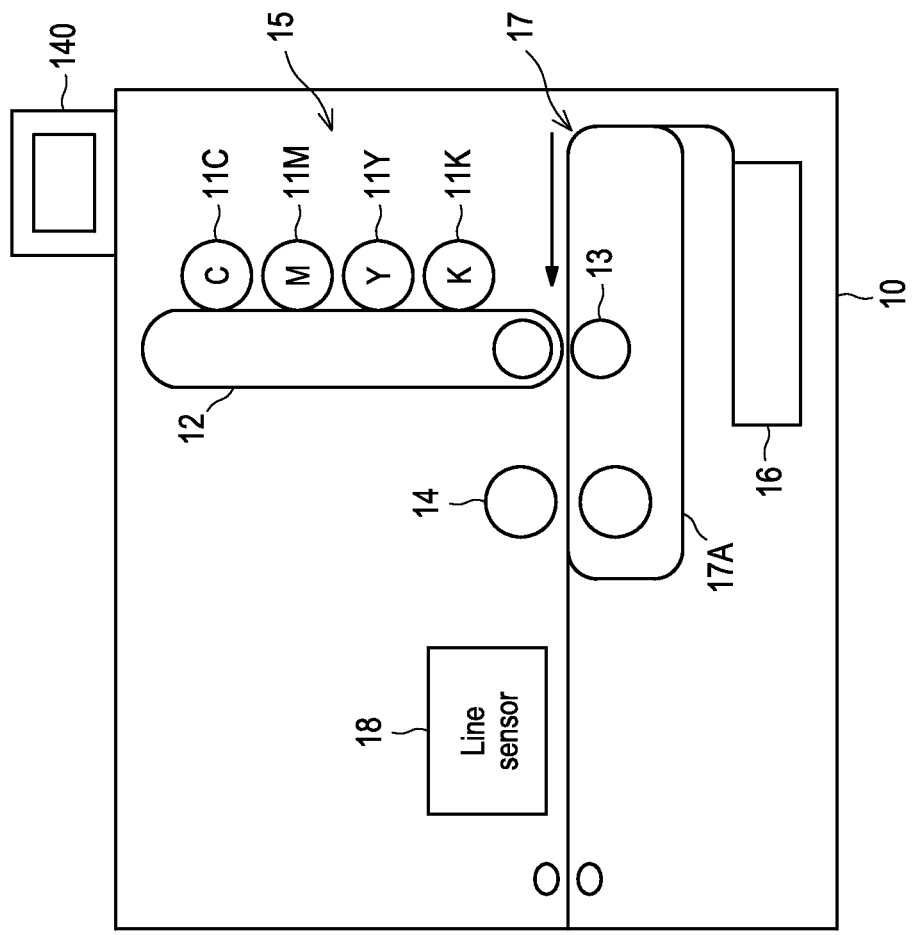
FIG. 2 is a diagram showing a mechanical outline of an image forming apparatus according to the embodiment of the present invention.

FIG. 2 is a diagram showing an outline of a mechanical configuration of the image forming apparatus 10 among the plurality of image forming apparatuses.

The image forming apparatus 10 includes an image forming unit 15 that forms an image on transfer paper. The image forming unit 15 includes photoreceptors 11C, 11M, 11Y, and 11K (hereinafter, called "photoreceptor 11" to collectively call the photoreceptors) prepared for colors (cyan, magenta, yellow, black, and the like). A charger, a writing unit made of an LD, and a development unit not shown are provided for each color, at the circumferences of the photoreceptors 11C, 11M, 11Y, and 11K. On the surface of the photoreceptor 11 charged by the charger, the writing unit performs image exposure based on image information of the original recorded in an image memory or the like, and a latent image is formed on the surface of the photoreceptor 11. The development unit develops the latent image to form a toner image. The toner image is transferred to an intermediate transfer belt 12, and a secondary transfer roller 13 transfers the toner image from the intermediate transfer belt 12 to transfer paper conveyed in a conveyance path 17. The conveyance path 17 is extended to the outside of the apparatus. The conveyance path 17 can be connected to a post-processing apparatus not shown, or the paper can be directly discharged to a discharge tray.

A fixing apparatus 14 thermally fixes the transfer paper provided with the image, and the transfer paper is conveyed through the conveyance path 17. The image forming apparatus of the present invention can be a monochrome machine, and special colors (such as clear) other than the colors described above can be used.

A reverse conveyance path 17A for reversing the transfer paper formed the image to circulate the transfer paper to the upstream of the image forming unit 15 is branched from the conveyance path 17 on the downstream of the fixing apparatus 14.

A paper feed tray 16 including the transfer paper is arranged in the lower part of the housing in the image forming apparatus 10. The transfer paper can be paper or can be other media, such as OHP and cloth.

The transfer paper housed in the paper feed tray 16 is fed to the conveyance path 17 and is conveyed to the secondary transfer roller 13. At the secondary transfer roller 13, a color image or a monochrome image on the intermediate transfer belt 12 is transferred to the transfer paper. The fixing apparatus 14 applies heat and pressure to the transfer paper formed the image, and the toner image on the transfer paper is fixed. The image forming apparatus 10 can include a large-capacity paper feed tray, and the paper feed method of the transfer paper is not particularly limited.

A line sensor 18 that reads the image of the transfer paper conveyed through the conveyance path 17 is also arranged in the conveyance path 17, on the downstream of the point where the reverse conveyance path 17A separates from the conveyance path 17. The line sensor 18 can be an imaging element, such as CCD and CIS, and it is desirable that the line sensor 18 has a length exceeding the width of the transfer paper conveyed in the conveyance path 17. The line sensor 18 is equivalent to an image reading apparatus.

Although the image forming apparatus 10 includes the image reading apparatus in the description, the image reading apparatus can be included outside of the image forming apparatus, and this image reading apparatus can read the image of the transfer paper. The image forming apparatus 10 can acquire the result of reading outside of the apparatus through a network, a removable memory, manual input, or the like.

Figure 3:
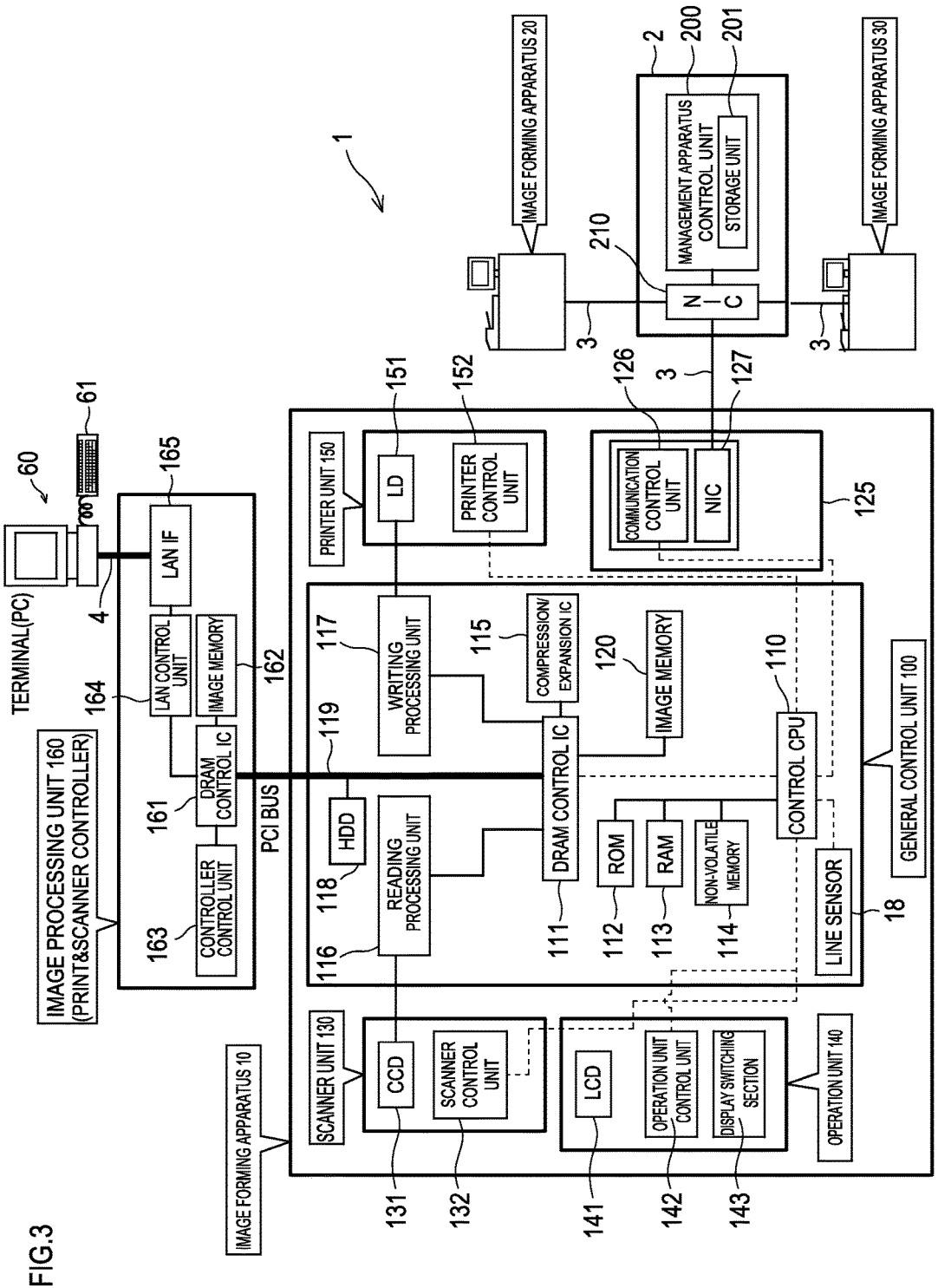
FIG. 3 is a diagram showing control blocks of the image forming system according to the embodiment of the present invention.

FIG. 3 is a control block diagram of the image forming system 1, and the image forming apparatus 10 is mainly depicted.

Main components of the image forming apparatus 10 include a general control unit 100, a scanner unit 130, an operation unit 140, a printer unit 150, and an image processing unit (print & scanner controller) 160 that processes image data input and output to and from an external device (for example, the terminal 60) through a LAN.

The terminal 60, such as a PC, is connected to the image forming apparatus 10 through the LAN 4. The terminal 60 includes a terminal operation unit 61 that accepts operation input. The LAN 4 is part of the network of the present invention, and the terminal 60 is part of the image forming system of the present invention.

The general control unit 100 includes a control CPU 110, and a DRAM control IC 111 is connected to the control CPU 110.

A ROM 112, a RAM 113, and a non-volatile memory 114 are connected to the control CPU 110.

A program for operating the CPU is stored in the ROM 112, and the RAM 113 functions as a work area or the like. Operation parameters and the like are stored in the non-volatile memory 114.

The control CPU 110 controls the entire image forming apparatus 10, figures out the state of the entire image forming apparatus 10, and receives reading results of the image forming unit 15, the conveyance path 17, and the line sensor 18. The control CPU 110 can also control a communication unit 125 described later to transmit and receive data to and from an external device and the like through a network.

The scanner unit 130 includes a CCD 131 that performs optical reading and a scanner control unit 132 that controls the entire scanner unit 130. The scanner control unit 132 is connected to the control CPU 110 and is controlled by the control CPU 110. The scanner control unit 132 can include a CPU, programs for operating the CPU, and the like. A reading processing unit 116 processes the data of image information read by the CCD 131. The reading processing unit 116 is connected to the DRAM control IC 111, and image data processed by the reading processing unit 116 is transmitted to the DRAM control IC 111.

The operation unit 140 includes a touch-panel LCD 141 and an operation unit control unit 142. The LCD 141 and the operation unit control unit 142 are connected, and the operation unit control unit 142 and the control CPU 110 are connected to allow serial communication. Based on the configuration, the control CPU 110 controls the operation unit 140. The operation unit control unit 142 can include a CPU, programs for operating the CPU, and the like.

The DRAM control IC 111 is connected to the image memory 120. Image information acquired by the scanner unit 130, image information, print conditions, and file information acquired through the LAN 4, and the like are stored in the image memory 120. As described, the image memory 120 is a storage area of image information, print conditions, and file information, and information of a job to be printed is stored.

An HDD 118 (hard disk) is connected to the DRAM control IC 111, and data can be stored in a non-volatile manner. Image information acquired by the scanner unit 130, image information generated by the terminal 60 or the like connected to the image processing unit (print & scanner controller) 160, and the like can be saved in the HDD 118. Operation parameters and the like can also be stored in the HDD 118.

A writing processing unit 117 is further connected to the DRAM control IC 111. The writing processing unit 117 is connected to an LD 151 of the printer unit 150, and the writing processing unit 117 processes data used for the operation of the LD 151. The printer unit 150 includes a printer control unit 152 that controls the entire printer unit 150, and the printer control unit 152 is connected to and controlled by the control CPU 110.

In the image processing unit (print & scanner controller) 160, an image memory 162 made of a DRAM or the like is connected to a DRAM control IC 161. In the image processing unit (print & scanner controller) 160, the DRAM control IC 161, a controller control unit 163 that controls the entire image processing unit (print & scanner controller) 160, a LAN control unit 164, and a LAN interface 165 are connected to a common bus. The LAN interface 165 is connected to the LAN 4.

A communication control unit 126 that controls the entire communication unit 125 for communication with the outside is connected to the control CPU 110, and the CPU 110 can be connected to the LAN 3 through a NIC 127 (network interface card) included in the communication unit 125. The communication control unit 126 is operated by an operation command of the control CPU 110, and the communication control unit 126 sends out data, such as image information, instruction information, and image quality parameters, received from the control CPU 110 to the LAN 3 through the NIC 127 based on a preset communication procedure. The communication control unit 126 also receives data, such as image information and instruction information, transmitted from the LAN 3 through the NIC 127 and sends out the data to the control CPU 110.

The line sensor 18 is connected to the control CPU 110 to allow controlling, and the control CPU 110 controls the operation of the line sensor 18. The control CPU 110 can receive a reading result of an image read by the line sensor 18 to calculate image quality parameters, such as tone, density balance, and line width, and can correct the image quality of the image forming unit. The image quality can be automatically corrected according to a setting, such as every predetermined number of sheets and every predetermined elapsed time, or the user can instruct the image quality correction through the operation unit 140.

When an image is read outside of the image forming apparatus, the reading result can be acquired through the network or can be input through the operation unit 140.

The other image forming apparatuses can have similar configurations, and both color image forming apparatuses and monochrome image forming apparatuses can be included.

The LAN 3 is connected to the NIC 127, and the other end of the LAN 3 is connected to a NIC 210 of the management apparatus 2.

Basic operation of the image forming apparatus 10 will be described.

A procedure of accumulating image information in the image forming apparatus 10 will be described first.

To read an image of the original to generate image information in the scanner unit 130 of the image forming apparatus 10, the CCD 131 in the scanner unit 130 optically reads the image of the original from the original. In this case, the scanner control unit 132 that receives a command from the control CPU 110 controls the operation of the CCD 131. The reading processing unit 116 applies data processing to the image read by the CCD 131, and the processed image information is stored in the image memory 120 and the HDD 118 through the DRAM control IC 111. The image information and the print information stored in the image memory 120 and the HDD 118 can be managed as a job by the control CPU 110.

When the image information and the print information are acquired from the outside, the DRAM control IC 161 stores the job information transmitted from the terminal 60 or the like through the LAN4, in the image memory 162 through the LAN interface 165 and the LAN control unit 164, for example.

The print data of the image memory 162 is temporarily stored in the image memory 120 through the DRAM control IC 161, a PCI bus 119, and the DRAM control IC 111. When the print data is page description data, the controller control unit 163 can convert the print data into raster image by a RIP process.

The image information and the print information can also be acquired from the management apparatus 2 and the other image forming apparatuses through the NIC 127. The job information is temporarily stored in the image memory 120 through the DRAM control IC 111.

A compression/expansion IC 115 applies a compression process to the image information stored in the image memory 120 through the DRAM control IC 111, and the image information is stored in the image memory 120 through the DRAM control IC 111. To store the image information in the HDD 118, the image information is compressed through the DRAM control IC 111 and the compression/expansion IC 115 and is stored in the HDD 118. The control CPU 110 manages the job information as described above. In the job management, print conditions are set and stored in the image memory 120 and the HDD 118 in association with the image information.

The print conditions include information, such as print mode, paper information, paper feed tray, discharge location, and post-processing condition. Specifically, examples of the print conditions include the number of pixels of output image, color or monochrome, one side or both sides, tone adjustment, paper size, direction of paper, type of paper (such as paper type, weight, and color of paper), selection of paper feed tray, presence or absence of post-processing, and post-processing condition.

The user sets the print conditions through the operation unit 140, or the control unit automatically sets the print conditions based on initial setting or operation status.

When the job information is transmitted from the terminal 60 or when the image forming apparatus acquires the job, an image forming apparatus that outputs the job can be specified, or an arbitrary image forming apparatus can be a selection target. Distributed output for outputting the job by a plurality of image forming apparatuses can be designated in the terminal operation unit 61 of the terminal 60 or the operation unit 140, and in this case, an image quality parameter to be emphasized in the comparison of the image quality parameters can be set.

When the print data stored in the image memory 120 is used in outputting the image by the image forming apparatus 10, that is, in using the image forming apparatus 10 as a copy machine or a printer, the image information is sent out to the compression/expansion IC 115 through the DRAM control IC 111 to expand the data. When the image information stored in the HDD 118 is used, the print data of the HDD 118 is sent out to the compression/expansion IC 115 through the DRAM control IC 111 to expand the data. The expanded image information is sent out to the writing processing unit 117, and the LD 151 performs writing in the photoreceptors according to the print information associated with the image information.

In the printer unit 150, the printer control unit 152 that has received a command of the control CPU 110 controls the components. In this case, the print conditions are referenced, and control based on the content of the print conditions is performed. In the image forming unit 15, the toner images written in the photoreceptors are transferred to the intermediate transfer belt 12. The toner images are then transferred to the transfer paper supplied by the paper feed tray 16, and the fixing apparatus 14 fixes the toner images. A cleaning unit not shown removes residual toner in the photoreceptors 11 after the transfer of the toner images to the intermediate transfer belt 12. The cleaning unit not shown also removes residual toner in the intermediate transfer belt 12 after the transfer of the toner images to the transfer paper. The transfer paper is discharged to the downstream by the conveyance path 17. To print images on both sides of the transfer paper, the transfer paper passed through the fixing apparatus 14 is transmitted to the circulation path 17A and returned to the conveyance path 17 to form the image on the back side.

To correct the image quality, an image patch can be formed in a margin area or the like of the transfer paper, and the line sensor 18 or a sensor included in the image forming unit can read the image patch to correct the image quality. The image quality can be periodically corrected for every predetermined number of sheets or every predetermined time, and the control CPU 110 can control and execute the image quality correction based on an instruction by the user through the operation unit 140 or a command from an external apparatus. After the image quality correction, a chart can be further formed on the transfer paper to acquire image quality parameters, and the line sensor 18 can read the chart. The image quality parameters can also be calculated from the result of the image quality correction. The image quality parameters after the image quality correction are stored in the non-volatile memory 114 and the HDD 118 and transmitted to the management apparatus 2 through the NIC 127. The management apparatus 2 registers the updated image quality parameters in the storage unit 201.

To perform distributed printing in the image forming apparatus 10, while the control CPU 110 causes the image forming apparatus 10 to output the printed matter as necessary, the control CPU 110 issues an instruction of the distributed printing to the management apparatus 2 and transmits the image information to the management apparatus 2. When conditions or image quality parameters for determining the similarity are designated in the distributed printing or when the distributed printing is based on the image quality parameters of the image forming apparatus 10, they are transmitted to the management apparatus 2. Instead of outputting the printed matter, the image forming apparatus 10 can request the management apparatus 2 to perform the distributed printing.

The management apparatus 2 includes a management apparatus control unit 200, and the other image forming apparatuses 20 to 50 are connected to the NIC 210.

The management apparatus control unit 200 includes a CPU, programs for operating the CPU, and the like and further includes a storage unit 201 including a ROM, a RAM, a non-volatile memory, and the like.

The management apparatus control unit 200 can control the operation of the image forming apparatuses. In the distributed printing, the management apparatus control unit 200 can receive a request of the distributed printing and select image forming apparatuses that have similar image quality parameters and that can output the job. The management apparatus control unit 200 can instruct the selected image forming apparatuses to perform the distributed printing of the job.

In selecting the image forming apparatuses, the management apparatus 2 selects image forming apparatuses with image quality parameters similar to each other. The image quality parameters are transmitted from the image forming apparatuses and registered in advance in the storage unit 201. When new image quality parameters are transmitted from the image forming apparatuses, the parameters are updated to the new image quality parameters and registered. The image forming apparatuses are limited to the ones that can output the printed matter from the job information.

To determine the similarity, the management apparatus control unit 200 uses designated image quality parameters or image quality parameters that are set based on the type of the job.

In the similarity determination, the image forming apparatuses can be selected so that the similarity range is small, or a standard can be set to select image forming apparatuses similar to the standard. Image quality parameters of a specific image forming apparatus such as a master device can be used as the standard.

In this embodiment, the control CPU 100 and the management apparatus control unit 200 cooperate to function as a control unit of the present invention.

Although the control CPU 100 of the image forming apparatus 10 and the management apparatus control unit 200 of the management apparatus 2 cooperate to function as the control unit in the embodiment, it is possible that only the management apparatus control unit 200 of the management apparatus 2 functions as the control unit of the present invention.

Figure 4:
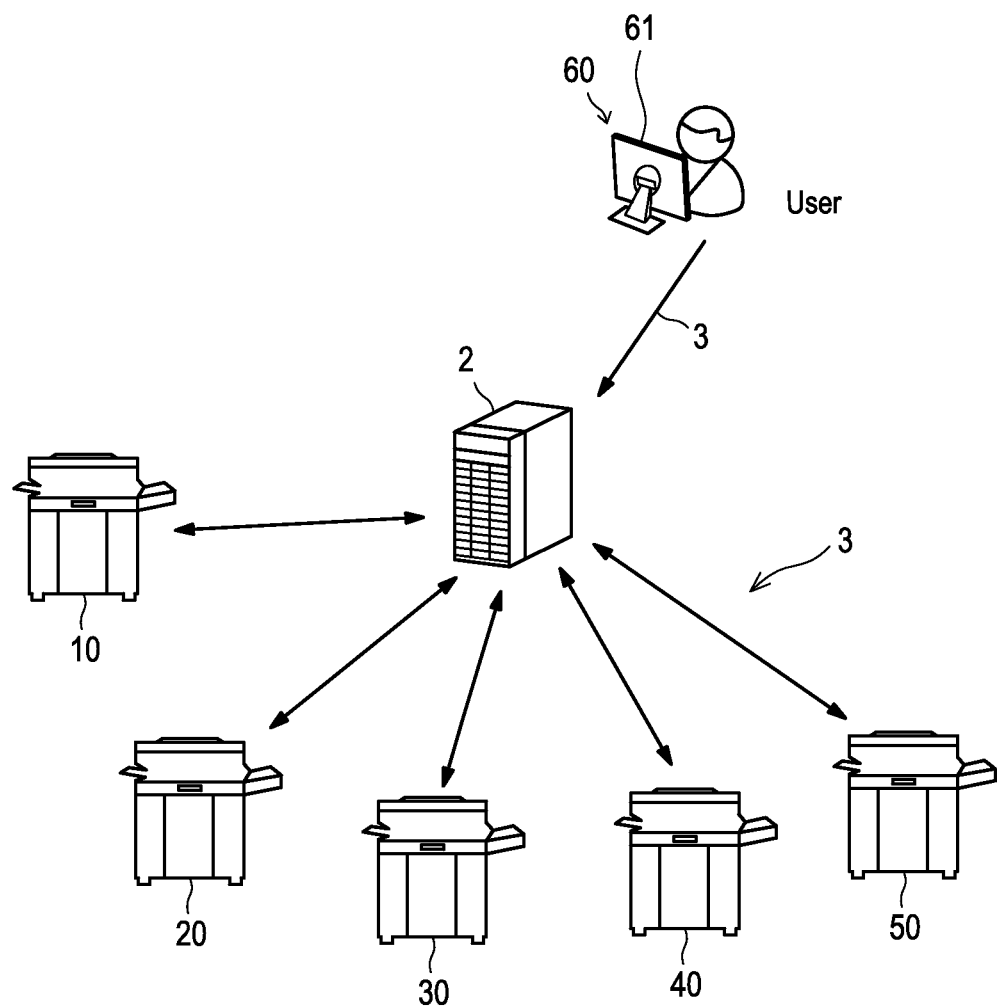
FIG. 4 is a schematic diagram showing an image forming system according to another embodiment of the present invention.

FIG. 4 is a schematic diagram showing an example of this image forming system 1A. The details of the management apparatus 2 are as already described, and the description will not be repeated here.

In the image forming system 1A, the terminal 60 is connected to the management apparatus 2 through the LAN 3, and the terminal 60 can request the management apparatus 2 to output the printed matter. The distributed printing can be instructed in the terminal 60, and when the image forming apparatuses that output the printed matter are not specified in the terminal 60, the management apparatus 2 can handle this as distributed printing. In selecting the image forming apparatuses, the image quality parameter to be emphasized can be set in the terminal 60. The management apparatus 2 can set the image quality parameters according to the content of the job, and initial image quality parameters for comparison can be set in advance in the management apparatus 2.

In the distributed printing, the management apparatus control unit 200 of the management apparatus 2 reads the image quality parameters of the image forming apparatuses registered in the storage unit 201 and compares the image quality parameters. In this case, if the content to be emphasized in the image quality parameters is set, the comparison is performed according to the content. In selecting the image forming apparatuses, image forming apparatuses that have image quality parameters similar to each other and that can output the printed matter are selected, and instructions for the distributed output of the job are issued to the selected image forming apparatuses. The job information is transmitted from the terminal 60, and the management apparatus 2 transmits the job information to the selected image forming apparatuses.

In the distributed printing, each image forming apparatus can output an entire copy, or pages can be divided to perform distributed printing by a plurality of image forming apparatuses. A combination of these is also possible.

In the distributed printing, it is possible that only one image forming apparatus outputs the printed matter instead of selecting a plurality of image forming apparatuses, for a reason that the difference in the image quality parameters is large, for example.

Although the management apparatus 2 is an essential component in the description of the embodiments described above, the image forming apparatus 10 can function as the management apparatus, for example.

Figure 5:
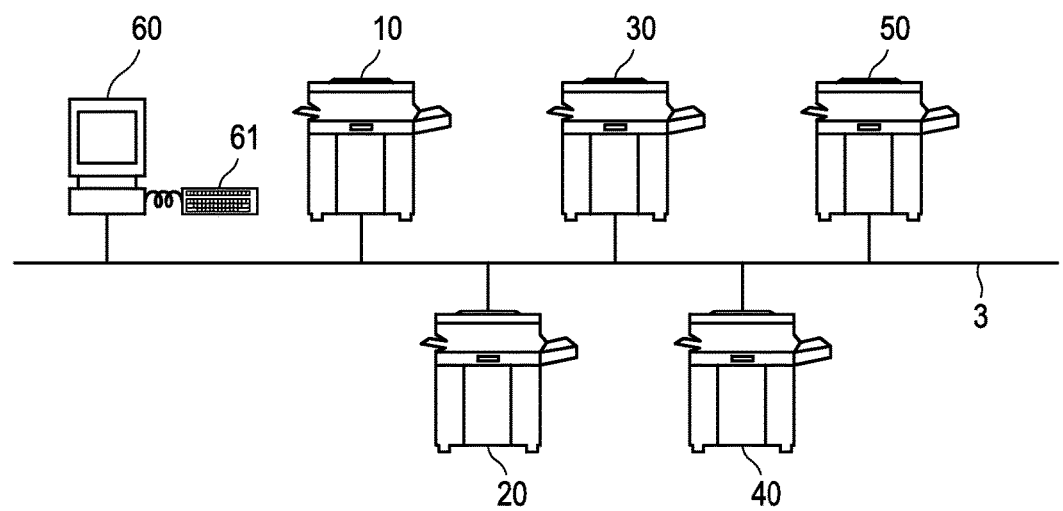
FIG. 5 is a schematic diagram showing an image forming system according to yet another embodiment of the present invention.

FIG. 5 is a schematic diagram showing an example of this image forming system 1B. The details of the image forming apparatus 10 are already described, and the description will not be repeated here.

The control CPU 100 functions as a control unit of the present invention and controls the distributed printing. The control CPU 100 compares the image quality parameters of the image forming apparatuses to select similar image forming apparatuses and controls the selected image forming apparatuses to perform the distributed printing. The image quality parameters of the image forming apparatuses can be stored in the non-volatile memory 114 and the HDD 118 in a non-volatile manner. A storage device can be connected to a network, and the image quality parameters of the image forming apparatuses can be registered in the storage device.

The job information can be acquired from the terminal 60, or the image forming apparatus 10 can acquire the job information by reading the original or the like. The image forming apparatus 10 can perform printing, and other image forming apparatuses can perform distributed printing. It is possible that the image forming apparatus 10 does not perform printing, and only other image forming apparatuses perform distributed printing.

Figure 6:
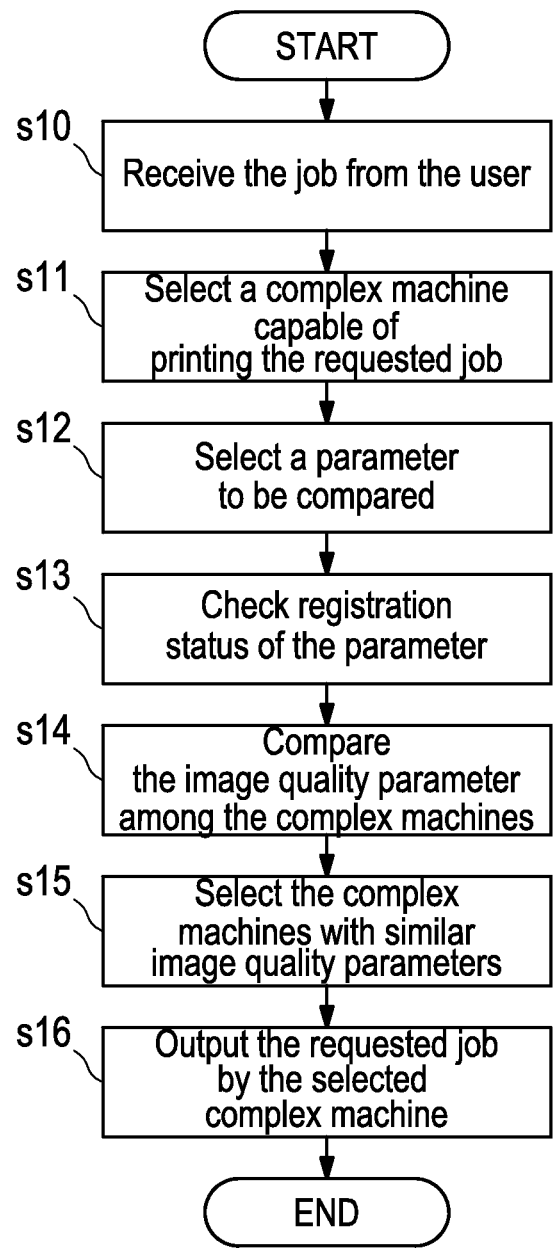
FIG. 6 is a flow chart showing an image forming method according to an embodiment of the present invention.

A procedure of image formation in the image forming system 1 illustrated in FIG. 1 will be described with reference to a flow chart of FIG. 6. The control unit of the present embodiment controls and executes the following procedure.

For example, when three complex machines perform distributed printing, the user first instructs an arbitrary image forming apparatus to perform the distributed printing by three complex machines and transmits the job as in FIG. 1. The image forming apparatus operates as a main machine and is the image forming apparatus 10 in FIG. 1.

The image forming apparatus 10 (main machine) that has received the job requests the management apparatus 2 in a cloud to perform the distributed printing of the job received from the user by three complex machines (step s10). In the designation of the distributed printing, complex machines in which the difference in the image quality parameters is within a predetermined range can be selected, instead of designating the number of complex machines. The predetermined number of complex machines to be selected and the predetermined difference in the image quality parameters can be set in advance and stored in a storage unit or the like. The predetermined number of complex machines and the predetermined difference in the image quality parameters can be designated in the request for distributed printing. A reference image forming apparatus can be designated from the image forming apparatuses for which the image quality parameters are compared.

The management apparatus 2 that has received the request checks the requested job information (setting of finisher configuration, monochrome/color, and the like) and selects an image forming apparatus capable of printing among a plurality of currently managed image forming apparatuses (complex machines in this example) (step s11).

A parameter of image quality (tone, density balance, or line width) to be compared is selected according to the type of the job (step s12), and registration status (such as elapsed time and the number of output sheets since the previous registration) of the selected parameter in each complex machine is checked (step s13). The image quality parameter can be automatically selected according to the content of the job. For example, the tone is selected for a color image, the density balance is selected for a monochrome image, and the line width is selected for a text or a line drawing. The user can also select the image quality parameter to be selected. A method is also possible, in which a plurality of image quality parameters are used, and a parameter with a main image quality parameter within a predetermined range and a sub image quality parameter within a predetermined range is selected, for example.

Figure 7:
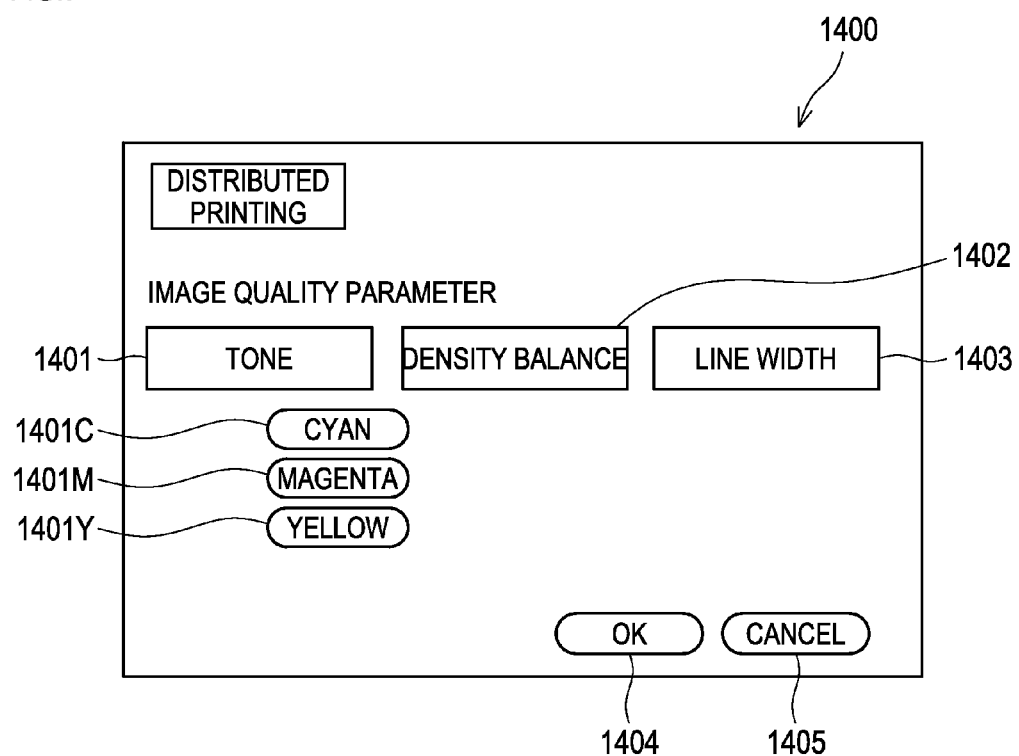
FIG. 7 is a diagram showing an image quality parameter instruction screen according to the embodiment of the present invention.

FIG. 7 shows an image quality parameter designation screen 1400 displayed by a printer driver or the like on the terminal operation unit 61 of the terminal 60. The image quality parameter designation screen 1400 displays a tone button 1401, a density balance button 1402, and a line width button 1403 that are items of image quality parameters to be emphasized in the distributed printing. The tone button 1401, the density balance button 1402, and the line width button 1403 can be operated, and one of them can be selected. When the tone button 1401 is pressed, a color can be designated, and a cyan button 1401C, a magenta button 1401M, or a yellow button 1401Y can be selected. The selection of the cyan button 1401C, the magenta button 1401M, and the yellow button 1401Y is arbitrary, and when one of them is selected, only the tone of the color is selected. The user can request to display the designation screen of the image quality parameters.

The image quality parameter designation screen 1400 displays an OK button 1404 and a cancel button 1405 that can be pressed. When the OK button is pressed, the selection of the image quality parameter is confirmed. When the cancel button 1405 is pressed, the selection of the image quality parameter is cancelled. The image quality parameter designation screen can be displayed on the operation unit 140 of the image forming apparatus 10 to make a selection.

To check the registration status, whether the image quality parameter has reached a predetermined elapsed time or a predetermined number of output sheets is determined. As a result of the check, the parameters of the complex machines determined to be without a problem are compared to the image quality parameter of the main machine (step s14), and two complex machines with image quality parameters similar to that of the main machine are selected (step s15).

Three machines including the selected complex machines and the main machine output the requested job (step s16). Specifically, the management apparatus 2 transmits output instructions and the job information to the selected complex machines.

In this way, the distributed printing in which the difference in the image quality is suppressed can be carried out.

Figure 8:
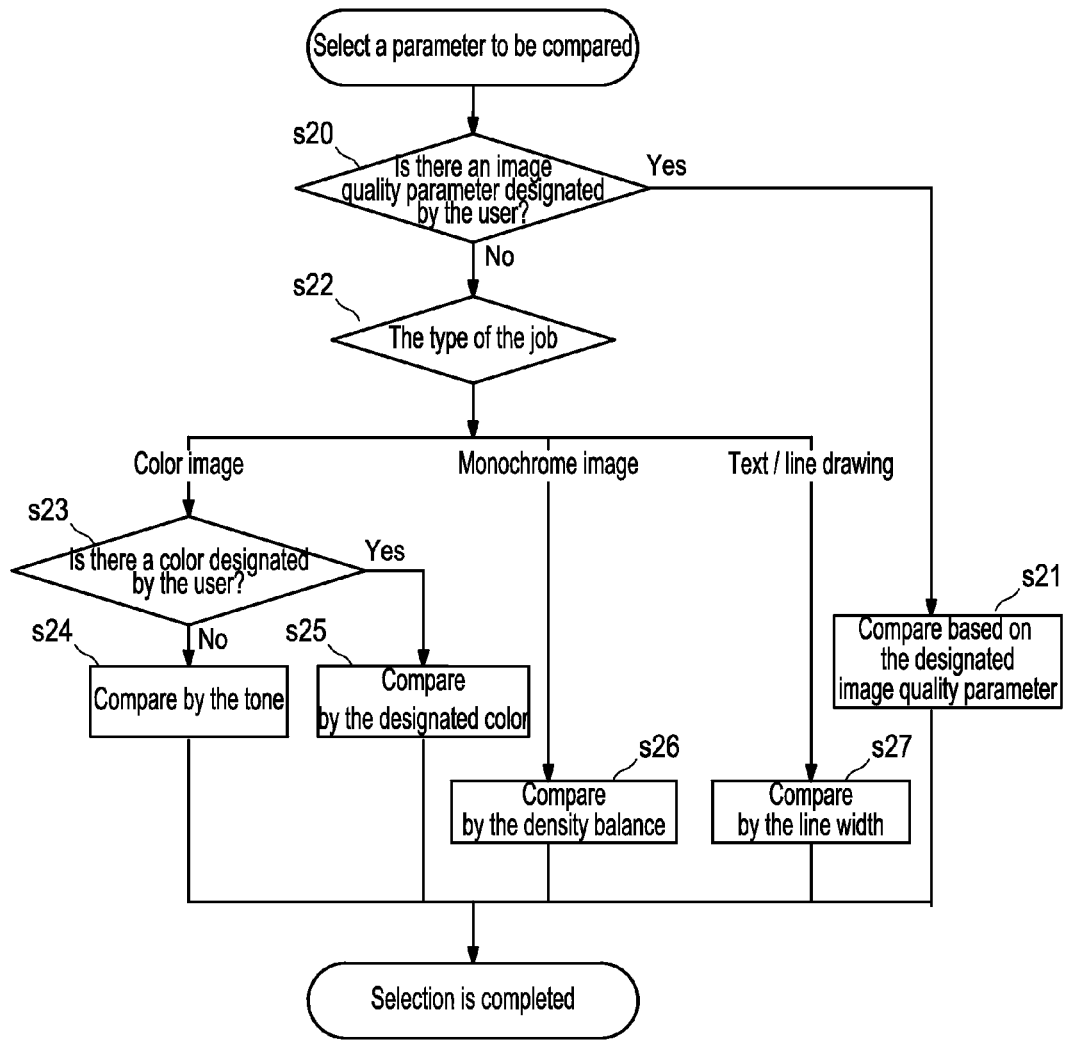
FIG. 8 is a flow chart showing a selection procedure of image quality parameters according to the embodiment of the present invention.

A selection procedure of a comparison parameter will be described with reference to a flow chart of FIG. 8. The control unit controls and executes the following procedure.

Whether there is an image quality parameter designated by the user is first determined (step s20). If there is a designated image quality parameter (step s20, Yes), the image quality parameters of the image forming apparatuses are compared based on the designated image quality parameter (step s21), and the selection is completed.

If there is no parameter designated by the user (step s20, No), the type of the job is determined (step s22).

If it is determined that the type of the job is a color image (step s22, color image) (however, it is possible that color images are included only in part of the pages), whether there is a color designated by the user is determined (step s23). If a color is not designated by the user (step s23, No), the tone is compared (step s24), and the selection is completed. If a color is designated by the user (step s23, Yes), the designated color is compared (step s25), and the selection is completed.

Figure 9:
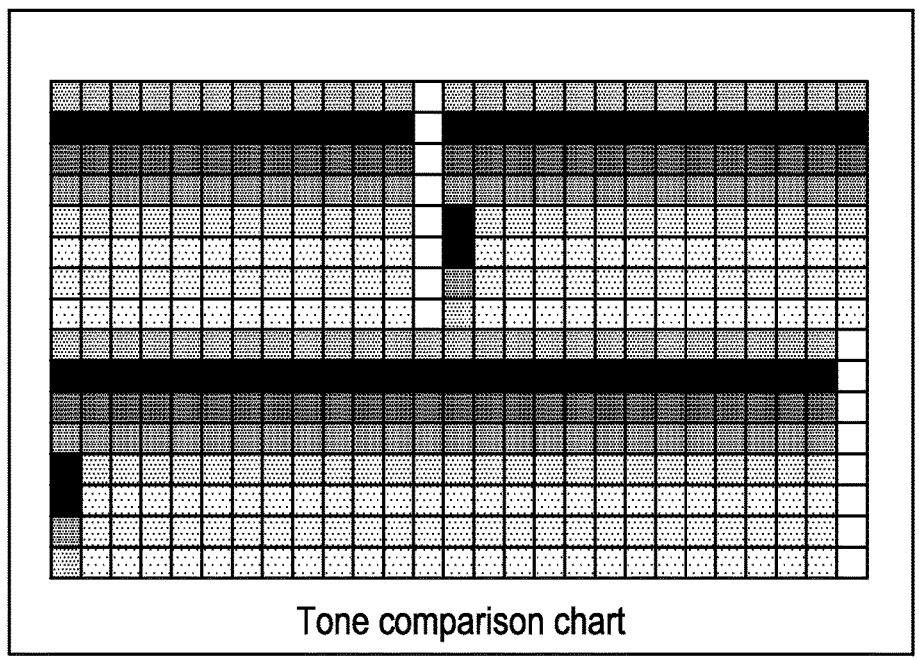
FIG. 9 is a diagram showing a tone comparison chart according to the embodiment of the present invention.

The tone can be compared by reading a chart as shown in FIG. 9 by an inline sensor or the like to acquire Lab values of colors, and the tone can be compared by average values of difference ΔE of the Lab values. In the chart, the same colors are printed in the horizontal axis direction of the drawing.

If the user designates a color to be emphasized, the complex machines can be compared just by ΔE of the designated color to determine the similarity, instead of the average values of ΔE.

For example, the Lab values of the specific color in the main machine are (70, 30, 35), and as for the complex machines to be compared, the Lab values of the specific color are (71, 31, 36) in a complex machine A, (70, 32, 36) in a complex machine B, and (70, 33, 35) in a complex machine C. In this case, when ΔE is calculated, values shown in Expression 1 are calculated. The complex machine A is determined to be the most similar complex machine regarding the specific color.

In the complex machine A, $\Delta E = \sqrt{1^2+1^2+1^2} = 1.7$

In the complex machine B, $\Delta E = \sqrt{0^2+2^2+1^2} = 2.2$

In the complex machine C, $\Delta E = \sqrt{0^2+3^2+0^2} = 3.0$     [Expression 1]

If the type of the job is a monochrome image (step s22, monochrome image), the image quality parameters are compared by the density balance (step s26), and the selection is completed.

Figure 10:
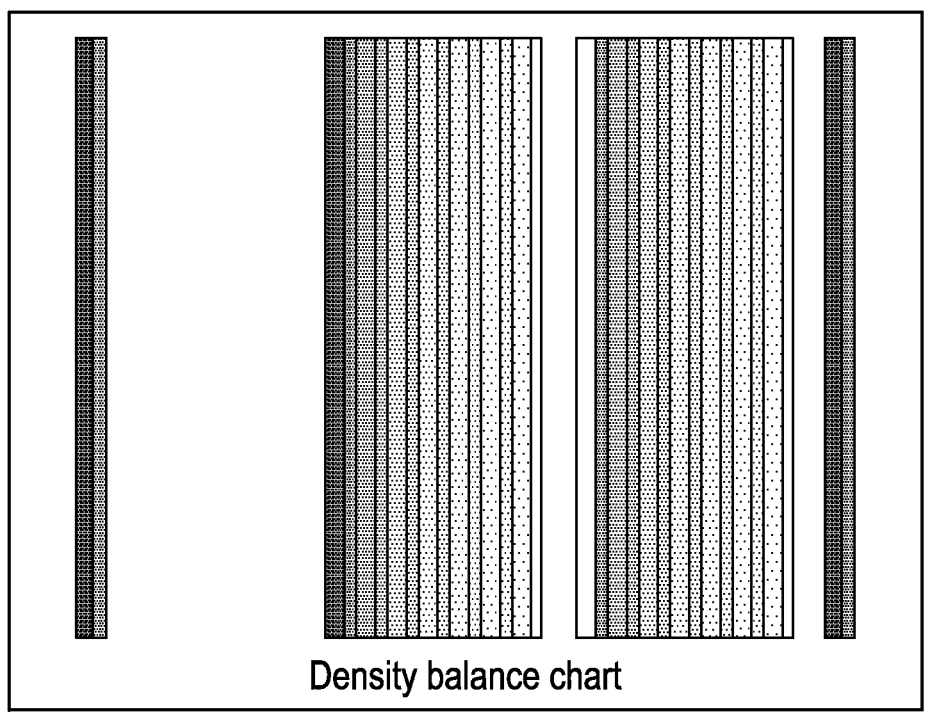
FIG. 10 is a diagram showing a density balance chart according to the embodiment of the present invention.

The density balance can be compared by reading a chart as in FIG. 10 by an inline sensor or the like to acquire Lab values of each density, and the density balance can be compared by average values of difference ΔE of the Lab values. The chart formed is a chart with density difference in the horizontal direction of the drawing.

If the type of the job is a text or a line drawing (step s22, text or line drawing), the image quality parameters are compared by the line width, and the selection is completed.

Figure 11:
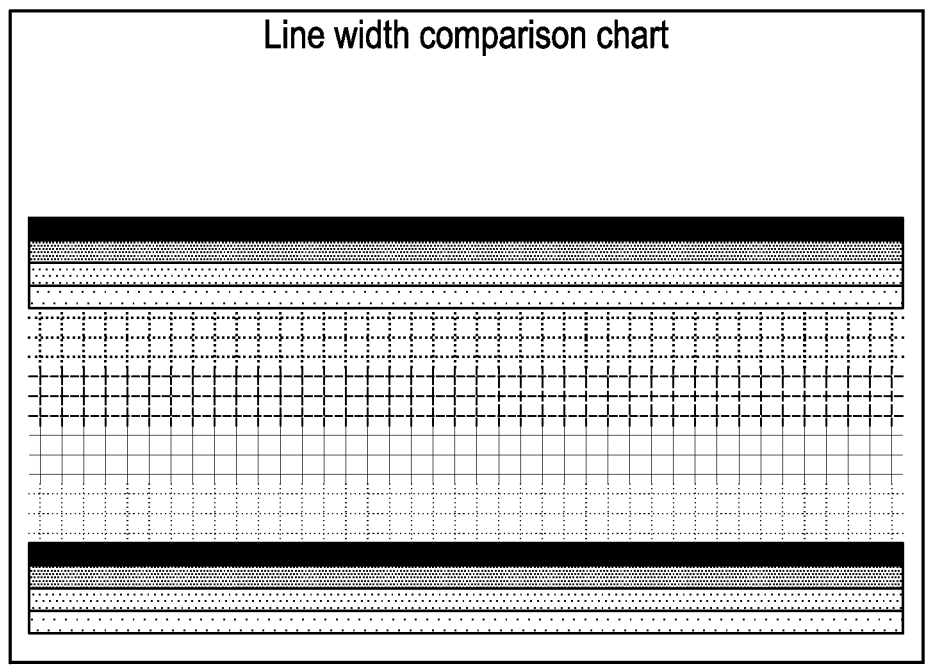
FIG. 11 is a diagram showing a line width comparison chart according to the embodiment of the present invention.

The line width is compared by reading a chart as in FIG. 11 by an inline sensor or the like to acquire the line width of each line, and the line width can be compared by average values of difference of the line width. Dotted lines and dashed lines are used in FIG. 11 for the convenience of expressing the difference in color.

For example, if the difference in the line width between the main machine and the complex machine to be compared is +2 μm in the complex machine A, −1 μm in the complex machine B, and −2 μm in the complex machine C, the complex machine B with the smallest difference is determined to be the similar complex machine.

If the parameters of the image quality of the complex machines registered in the management apparatus remain to be parameters of the same image quality, there can be a difference from the parameters of the current image quality of the complex machines. Therefore, it is desirable to periodically transmit the parameters of the image quality from the registered complex machines to the management apparatus to update the registered parameters.

For example, if the update interval is set to three days, the image quality parameters are acquired in the complex machines every three days, and the acquired image quality parameters are transmitted to the management apparatus to update the registered parameters.

When the image quality is corrected in a complex machine registered in the management apparatus, it is desirable to transmit the parameters of the image quality acquired at this time to the management apparatus to thereby update the parameters of the image quality of the complex machine registered in the management apparatus.

Updating the image quality parameters can reduce the effect of the change in the image quality that occurs with time.

When a large-capacity job is received, and the time required for printing is long, the image quality is corrected during printing in some cases. In this case, it is desirable to transmit the parameters of the image quality at this time to the management apparatus to perform the comparison again based on the parameters of the image quality to thereby select a complex machine with similar parameters again.

Figure 12:
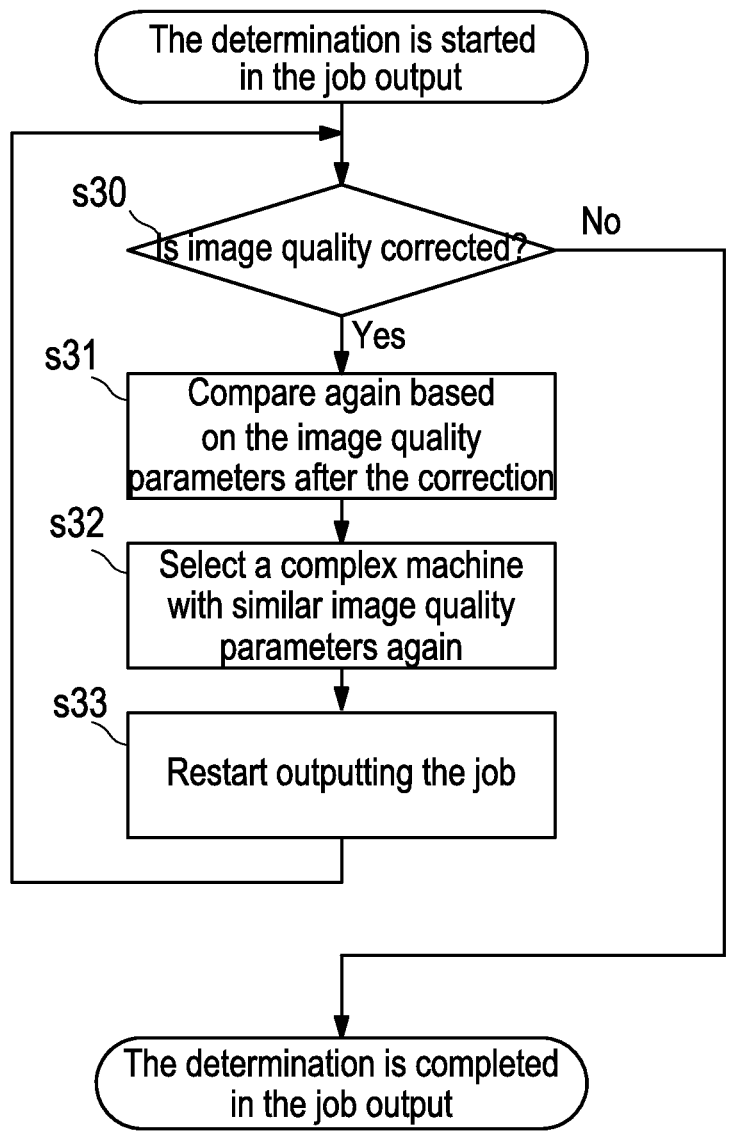
FIG. 12 is a flow chart showing a procedure of determining occurrence of image quality correction at job output according to the embodiment of the present invention.

The procedure will be described with reference to a flow chart of FIG. 12. The control unit controls and executes the following procedure.

When the determination is started in the job output, whether the image quality is corrected in the imaging forming apparatus outputting the job is determined (step s30). If the image quality is not corrected (step s30, No), the determination is completed.

If the image quality is corrected (step s30, Yes), similar image forming apparatuses are compared again based on the image quality parameters after the correction (step s31). The determination can be completed if there is no change in the image quality parameters after the correction.

After the second comparison (step s31), a complex machine with similar image quality parameters is selected (step s32). Details of the similarity determination are the same as the details of the previous similarity determination. The selected image forming apparatus then restarts outputting the job, and the process returns to step s30.

For example, the image quality is corrected in the complex machine B during printing of a large-capacity job by three machines including the main machine, the complex machine A, and the complex machine B. There is a change in the acquired parameters, and as a result, the complex machine C that has been out of the printing target is now more similar than the complex machine B. In this case, printing by the complex machine B is cancelled, and the complex machine C executes printing to reduce the degradation in the image quality caused by the temporal change of the complex machine B.

This update of the image quality parameters can also reduce the effect of the change in the image quality that occurs with time.

Although the image quality is corrected in the image forming apparatus that is outputting a job, the comparison can also be performed again when the image quality is corrected in an image forming apparatus that is not outputting the job.

Since a large-capacity job is simulated in the procedure, the determination can be made when the number of sheets of the job is a predetermined number of sheets. The predetermined number of sheets is set in advance and stored in a storage unit or the like. Whether to make the determination can be judged based on the number of remaining sheets in the job, instead of the number of sheets in the entire job.

Details of checking the registration status of the image parameters described in the flow chart of FIG. 6 will be described with reference to a flow chart of FIG. 13 or 14. The control unit controls and executes the following procedure.

Figure 13:
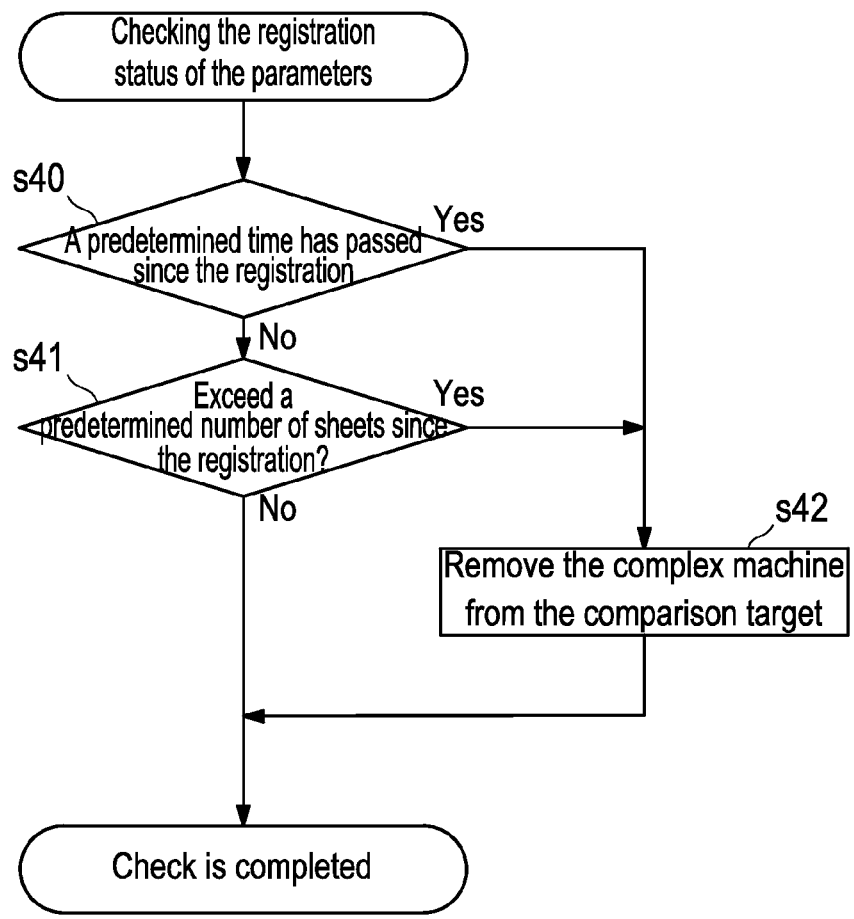
FIG. 13 is a flow chart showing a procedure of checking image quality parameter registration status to remove a comparison target according to the embodiment of the present invention.
Figure 14:
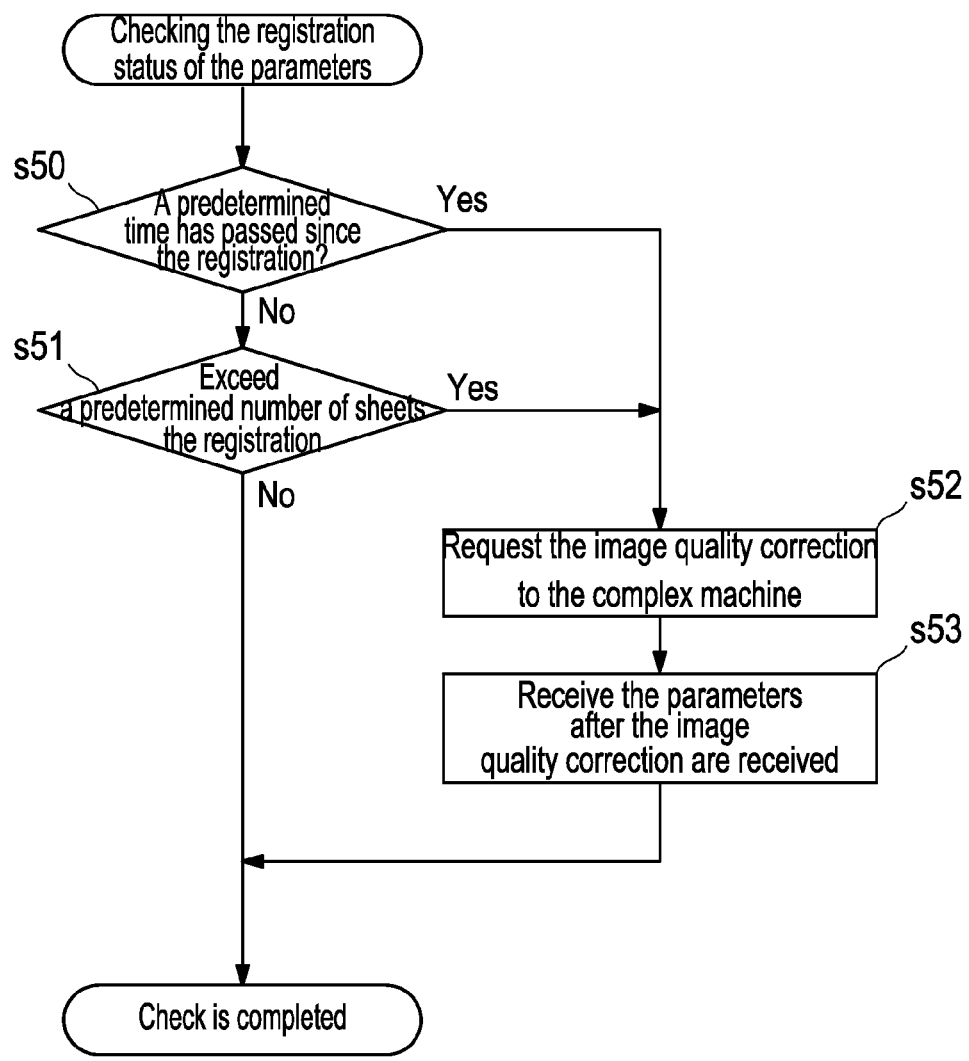
FIG. 14 is a flow chart showing a procedure of checking the image quality parameter registration status to request the image quality correction to register the image quality parameters according to the embodiment of the present invention.

In checking the registration status of the parameters, whether more than a predetermined time has passed since the registration of the parameters in the management apparatus, or whether the number of printed sheets in the complex machine corresponding to the image quality parameters exceeds a predetermined number of sheets is checked as in FIG. 13. As a result, if the time has passed or if the number of printed sheets exceeds the number of sheets, the corresponding complex machine is removed from the comparison target.

First, whether a predetermined time has passed since the previous registration is determined (step s40). The predetermined time can be set in advance and stored in a storage unit or the like.

If the predetermined time has passed since the registration (step s40, Yes), the complex machine is removed from the comparison target (step s42), and the check is completed.

If the predetermined time has not passed since the registration (step s40, No), whether the number of printed sheets since the previous registration exceeds a predetermined number of sheets is determined (step s41). If the number of printed sheets since the registration does not exceed the predetermined number of sheets (step s41, No), there is no violation of the predetermined time and the predetermined number of sheets, and the check is completed. If the number of printed sheets since the registration exceeds the predetermined number of sheets (step s41, Yes), the complex machine is removed from the comparison target (step s42), and the check is completed. The check is performed in each image forming apparatus.

Whether more than the predetermined time has passed since the registration of the image quality parameters, or whether the number of printed sheets in the complex machine corresponding to the image quality parameters exceeds the predetermined number of sheets is checked. As a result, if the time has passed and the number of printed sheets exceeds the predetermined number of sheets, the image quality correction can be requested to the corresponding complex machine, and corrected parameters can be received to update the parameters of the management apparatus. In this way, the check of the registration status can be completed, and the complex machines can be compared.

First, whether a predetermined time has passed since the previous registration is determined (step s50). The predetermined time can be set in advance and stored in a storage unit or the like.

If the predetermined time has passed since the registration (step s50, Yes), the image quality correction is requested to the complex machine (step s52). The parameters after the image quality correction are received from the image forming apparatus that has corrected the image quality (step s53), and the check is completed.

If the predetermined time has not passed since the registration (step s50, No), whether the number of printed sheets since the previous registration exceeds a predetermined number of sheets is determined (step s51). If the number of printed sheets since the registration does not exceed the predetermined number of sheets (step s51, No), there is no violation of the predetermined time and the predetermined number of sheets, and the check is completed. If the number of printed sheets since the registration exceeds the predetermined number of sheets (step s51, Yes), the image quality correction is requested to the complex machine (step s52). The parameters after the image quality correction are received from the image forming apparatus that has corrected the image quality (step s53), and the check is completed.

For example, if the number of printed sheets that requires update is set to 1000, the number of sheets that the complex machine corresponding to the parameters of the image quality registered in the management apparatus has printed after the registration is checked. The image quality correction is requested to the complex machine exceeding 1000 sheets, and the parameters of the management apparatus are updated by the parameters of the image quality acquired after the correction. In this way, the check of the registration status is completed, and the complex machines are compared.

According to the check of the registration status, the difference between the information of the image quality parameters of the registered image forming apparatus and the current state of the machine can be eliminated.

Although the image forming method is described with reference to the flow charts based on the image forming system shown in FIG. 1, the image forming method can also be similarly carried out in the image forming systems shown in FIGS. 2 and 3.

As described, according to the embodiments, an output object can be obtained while reducing the difference in the image quality due to the mechanical difference between image forming apparatuses when a plurality of image forming apparatuses print a job in a distributed manner.

Although the present invention has been described based on the embodiments, appropriate changes can be made without departing from the scope of the present invention.

What is claimed is:

1. An image forming system in which a plurality of image forming apparatuses are connected through a network, the image forming system comprising:
    a control unit that controls the image forming apparatuses, wherein
    the control unit is configured to, when outputting a job to a plurality of image forming apparatuses, compare image quality parameters of each of the image forming apparatuses to the image quality parameters of one of the image forming apparatuses, select image forming apparatuses that have image quality parameters similar to the image quality parameters of the one of the image forming apparatuses and that can output the job, and cause the selected image forming apparatuses and the one of the image forming apparatuses to output the job.

2. The image forming system according to claim 1, wherein
    the image quality parameters include one or more of a tone, a density balance, and a line width.

3. The image forming system according to claim 1, wherein
    in selecting the image forming apparatuses, the control unit selects a preset number of image forming apparatuses.

4. The image forming system according to claim 1, wherein
    in selecting the image forming apparatuses, the control unit selects the image forming apparatuses in which a difference in the image quality parameters is within a preset range.

5. The image forming system according to claim 1, wherein
    the control unit compares the image quality parameters based on the image quality parameters in a specific image forming apparatus.

6. The image forming system according to claim 5, wherein
    the specific image forming apparatus is an image forming apparatus that has accepted the job.

7. The image forming system according to claim 1, wherein
    when the job is a color image, the control unit emphasizes the tone among the parameters of image quality to compare the parameters.

8. The image forming system according to claim 1, wherein
    when the job is a monochrome image, the control unit emphasizes the density balance among the parameters of image quality to compare the parameters.

9. The image forming system according to claim 1, wherein
    when the job is a text or a line drawing, the control unit emphasizes the line width among the parameters of image quality to compare the parameters.

10. The image forming system according to claim 1, wherein
    when an image quality parameter to be emphasized regarding the job is designated by a user, the control unit emphasizes the image quality parameter designated by the user among the image quality parameters to compare the parameters.

11. The image forming system according to claim 1, wherein
    when a color to be emphasized regarding the comparison of the tone is designated by a user, the control unit emphasizes the color designated by the user to compare the tone.

12. The image forming system according to claim 10, further comprising
    an operation unit that accepts operation input, wherein
    the control unit compares the image quality parameters based on image quality parameters input and set by the operation unit.

13. The image forming system according to claim 1, wherein
    the image quality parameters of the image forming apparatuses are registered in advance in the control unit.

14. The image forming system according to claim 13, wherein
    the image quality parameters are acquired based on images output by the image forming apparatuses and read by a image reading apparatuses.

15. The image forming system according to claim 1, wherein
    the image forming apparatuses periodically acquire the image quality parameters and transmit the image quality parameters to the control unit.

16. The image forming system according to claim 15, wherein
    the image forming apparatuses periodically correct the image quality and transmit the image quality parameters after the correction to the control unit.

17. The image forming system according to claim 1, wherein
    when the number of output sheets of the job is equal to or greater than a predetermined number of sheets, and the image quality is corrected in any of the image forming apparatuses during the output of the job, if the image quality parameters after the correction are different from the image quality parameters used for the comparison, the image quality parameters of the image forming apparatuses are compared again based on the image quality parameters after the correction, image forming apparatuses that have similar image quality parameters are selected, and the selected image forming apparatuses output the job.

18. The image forming system according to claim 1, wherein
    when the image quality is corrected in any of the image forming apparatuses during the output of the job, if the image quality parameters after the correction are different from the image quality parameters used at the start of the output, the image quality parameters of the image forming apparatuses are compared again based on the image quality parameters after the correction, image forming apparatuses that have similar image quality parameters are selected, and the selected image forming apparatuses output the job.

19. An image forming apparatus comprising:
an image forming unit that forms an image; and
a communication unit that is connected to a network to perform communication, the image forming apparatus being connected to a plurality of image forming apparatuses through the network, the image forming apparatus comprising:
  a control unit that controls the image forming apparatus, wherein
  the control unit is configured to, when outputting a job to a plurality of image forming apparatuses, compare image quality parameters of each of the image forming apparatuses to the image quality parameters of one of the image forming apparatuses, select image forming apparatuses that have image quality parameters similar to the image quality parameters of the one of the image forming apparatuses and that can output the job, and cause the selected image forming apparatuses and the one of the image forming apparatuses to output the job.

20. An image forming method of outputting a job by using a plurality of image forming apparatuses in an image forming system in which a plurality of image forming apparatuses are connected through a network, the image forming method comprising:
  accepting a job requested to be output in an arbitrary image forming apparatus;
  comparing image quality parameters of each of the plurality of image forming apparatuses to the image quality parameters of one of the image forming apparatuses;
  selecting image forming apparatuses from the plurality of image forming apparatuses that have the image quality parameters similar to the image quality parameters of the one of the image forming apparatuses and that can output the job; and
  outputting the job to the selected image forming apparatuses and the one of the image forming apparatuses.

21. The image forming system according to claim 1, wherein the control unit selects one of the image quality parameters based on a type of the job, compares the image forming apparatuses based on the selected image quality parameter, and selects some of the image forming apparatuses.

22. A non-transitory computer readable medium encoded with a program for causing an image forming system including a plurality of image forming apparatuses connected through a network to execute a method for outputting a job, the method comprising:
  accepting a job requested to be output in an arbitrary image forming apparatus;
  comparing image quality parameters of each of the plurality of image forming apparatuses to the image quality parameters of one of the image forming apparatuses;
  selecting image forming apparatuses from the plurality of image forming apparatuses that have the image quality parameters similar to the image quality parameters of the one of the image forming apparatuses and that can output the job; and
  outputting the job to the selected image forming apparatuses and the one of the image forming apparatuses.

23. The non-transitory computer readable medium according to claim 22, wherein
  when the number of output sheets of the job is equal to or greater than a predetermined number of sheets, and the image quality is corrected in any of the image forming apparatuses during the output of the job, if the image quality parameters after the correction are different from the image quality parameters used for the comparison, the image quality parameters of the image forming apparatuses are compared again based on the image quality parameters after the correction, image forming apparatuses that have similar image quality parameters are selected, and the selected image forming apparatuses output the job.

24. The non-transitory computer readable medium according to claim 22, wherein
  when the image quality is corrected in any of the image forming apparatuses during the output of the job, if the image quality parameters after the correction are different from the image quality parameters used at the start of the output, the image quality parameters of the image forming apparatuses are compared again based on the image quality parameters after the correction, image forming apparatuses that have similar image quality parameters are selected, and the selected image forming apparatuses output the job.

* * * * *